United States Patent [19]

Nöhren

[11] Patent Number: 4,635,884
[45] Date of Patent: Jan. 13, 1987

[54] ROTATING PARACHUTE

[75] Inventor: Hubert Nöhren, Hamburg, Fed. Rep. of Germany

[73] Assignee: Autoflug GmbH, Rellingen, Fed. Rep. of Germany

[21] Appl. No.: 673,045

[22] Filed: Nov. 19, 1984

[30] Foreign Application Priority Data

Nov. 22, 1983 [DE] Fed. Rep. of Germany ....... 3341990

[51] Int. Cl.⁴ .................................... B64D 17/24
[52] U.S. Cl. ........................................ 244/142
[58] Field of Search .................. 244/142, 145, 152

[56] References Cited

U.S. PATENT DOCUMENTS 1,855,320  4/1932  Schwabek ........................ 244/142
2,125,198  7/1938  Pool ................................. 244/142
3,493,199  2/1970  Flatau .............................. 244/145

FOREIGN PATENT DOCUMENTS 1443196  7/1976  United Kingdom ............... 244/142

Primary Examiner—Galen Barefoot
Assistant Examiner—Mark R. Valliere
Attorney, Agent, or Firm—Becker & Becker, Inc.

[57] ABSTRACT

A rotating parachute which makes it possible to transmit the energy of rotation to a load which is connected to the parachute. The inventive rotating parachute has a canopy which is connected via shroud lines to a load-carrier. The shroud lines are offset relative to the central longitudinal axis of the parachute.

16 Claims, 6 Drawing Figures

ROTATING PARACHUTE

BACKGROUND OF THE INVENTION

1. Field of the Invention

The present invention relates to a rotating parachute having a canopy which is connected to a load-carrier via shroud lines.

2. Description of the Prior Art

Rotating parachutes of this general type are known, and refer to parachute systems where the canopy rotates about its longitudinal axis during descent.

As a result of the rotation of the parachute canopy, it is particularly desired to achieve a stabilization of the parachute system as a whole, as well as a reduction of the so-called angle of swing, i.e., the angle about which, for example, a suspended load swings relative to the longitudinal axis of the parachute during descent.

Rotating parachutes are known which, in contrast to conventional parachute systems, can have an angle of swing which is reduced from plus or minus 25 degrees to plus or minus 3 degrees.

The rotation property of the parachute canopy has been achieved by various measures. For example, it is known to asymmetrically arrange the individual widths of material which form the parachute canopy. Pursuant to a further known form of construction, openings have been provided in the widths of material of the canopy; these openings produce a jet or nozzle effect for the air which flows through them, whereby a rotation action of the canopy as a whole is obtained as a function of the arrangement of these openings or of the individual widths of material of the canopy.

Problems have resulted with these heretofore known parachute systems to the extent that the individual shroud lines can become twisted, for example with a parachute on which a load is suspended, as a result of the rotation of the parachute canopy, so that problems can arise during descent, and such a parachute can even become unfit for use.

For this purpose also solutions have already been proposed, for example the interposition of a so-called twister between the parachute canopy and the load. Such a twister can, for example, comprise a ball bearing, so that torque which may be transmitted from the canopy via the shroud lines is not transmitted to the suspended load.

However, for certain applications it can be necessary and/or desirable to impart a rotation to the load. For example, such an application may include the arrangement on a parachute of a camera which is intended for taking panoramic photographs. For this purpose, it is necessary to rotate the load, i.e. the camera, with such rotation either being separately imparted, or being transmitted via the rotation of the parachute canopy. Other applications are also possible, for example the placement of a device for locating a certain object.

An object of the present invention is to provide a rotating parachute with which it is possible not only to achieve a rotation of the parachute canopy, but also to directly or indirectly transmit the energy of rotation to a suspended load with almost no delay.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
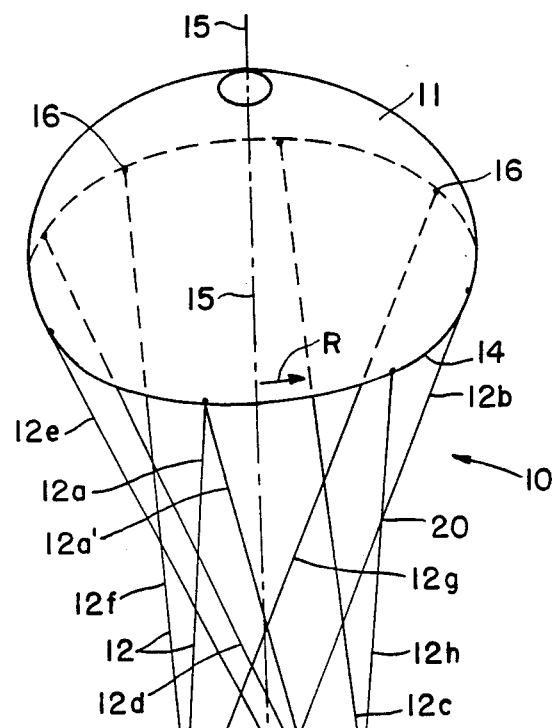
FIG. 1 is a schematic perspective view of one inventive embodiment of a rotating parachute on which is suspended a load.

The rotating parachute of the present invention is characterized primarily in that the shroud lines are offset relative to the central longitudinal axis of the parachute.

In contrast to heretofore known rotating parachutes, the shroud lines of the inventive parachute, in an imaginary extension of these lines, do therefore not extend through the central longitudinal axis of the parachute, but are rather spaced from this imaginary axis.

As a result, there is obtained a "skewing" of the individual shroud lines between the canopy and the load-carrier. The advantages connected herewith are as follows. When rotation of the parachute canopy occurs, the latter does not have to first advance a certain distance in order, via the shroud lines, to pull the load-carrier or the suspended load after it and hence at the same time to impart a rotary movement, rather, the torque transmitted from the parachute canopy can be transmitted directly to the load-carrier or the load via the inclined or skewed shroud lines. In this respect, a practically delay-free transmission of the torque occurs, since the skewed orientation of the shroud lines already exist in an unfolded state of the parachute system in which the canopy itself does not yet rotate. However, when the canopy does start to rotate, the individual shroud lines are already disposed in such a way that the load-carrier or the load can follow immediately.

An exceptionally high torque can be transmitted with the rotating parachute of the present invention without the shroud lines becoming twisted, and this transmission can start immediately upon rotation of the parachute canopy.

Pursuant to one advantageous specific embodiment of the present invention, it is proposed to dispose the individual shroud lines in various directions relative to the direction of rotation. With such an embodiment, for example, half of the shroud lines are disposed at an angle counter to the direction of rotation of the canopy, while the other half of the shroud lines are connected in the opposite direction of incline between the canopy and the load-carrier. This assures that the individual shroud lines do not become twisted, but rather that the inclined disposition of the individual shroud lines relative to one another remains unchanged. Furthermore, a direct transmission of the torque is effected via the shroud lines which are skewed in the direction of rotation, since right from the start these lines are taut between the parachute canopy and the load-carrier or load.

Inventively, several possibilities are proposed for the offset arrangement of the individual shroud lines relative to the central longitudinal axis of the parachute. The shroud lines can be offset in such a way that each shroud line has at least one intersection with one or more other shroud lines. Pursuant to one advantageous embodiment, each shroud line has two intersections, one with each of two other shroud lines.

Furthermore, an embodiment is proposed pursuant to the present invention, according to which from one or more of the shroud line connection points on the parachute canopy two or more shroud lines extend, the other ends of which are then respectively connected to a shroud line connection point on the load-carrier. The individual shroud lines preferably extend from their common connection point in different directions to the load-carrier. This same embodiment can also be constructed in reverse; i.e., from one shroud line connection point on the load-carrier, more than one shroud line can extend, whereby the individual shroud lines are then connected at individual shroud line connection points of the parachute canopy.

To the extent that the individual shroud lines have the same length, and are connected to the load-carrier at the same distance relative to the central longitudinal axis of the parachute, the load-carrier is essentially horizontally disposed during a vertical descent of the parachute if the center of gravity of the load-carrier lies in the central longitudinal axis of the parachute.

However, an embodiment may also be desired where the load-carrier or the load is disposed at an angle during descent of the parachute. Particularly suited for this purpose is an embodiment of the inventive rotating parachute according to which the shroud lines have different lengths, so that an inclined orientation of the load-carrier or load is automatically obtained if the individual shroud lines are customarily disposed at a uniform distance to the central longitudinal axis of the parachute.

Pursuant to a further variant of the present invention, it is proposed that the peripheral intervals of the shroud line connection points on the parachute canopy be kept equal-sized by means of a peripheral line when the canopy is filled. The sections of this tension line between the individual shroud line connection points is shorter than the corresponding periphery of the edge of the canopy. This reliably prevents a given width of material changing its shape, especially drawing together, during descent. Thus, the descent characteristic of a parachute equipped with such a tension line can be kept very constant.

The present invention furthermore makes available a complete rescue system, which comprises a rotating parachute of the previously described type, and a load which is suspended thereon. The load can be connected directly or indirectly to the parachute canopy via the shroud lines, for example by means of an interposed plate.

Pursuant to one embodiment, where a member, for example a plate, is inserted between the canopy and the load, this member can either be disposed in such a way that during vertical descent of the parachute it is horizontal, or it can be disposed at an angle as previously described in connection with the load-carrier.

A flexible connecting element which leads to the load and which is fixed against rotation is preferably disposed on the intermediate, interposed member. This element can, for example, be a flexible shaft or a non-rotatable steel cord, though it should be noted that the connecting element must be able to absorb torque, but cannot become twisted.

The load itself can be eccentrically suspended on the connecting element.

Pursuant to further specific features of the present invention, the shroud lines can comprise twisted cords. At the points of intersection, the shroud lines may be connected to one another in a slip-free manner, for example by being spliced or jointed.

DESCRIPTION OF PREFERRED EMBODIMENTS

Referring now to the drawings in detail, FIG. 1 illustrates a rotating parachute 10, which essentially comprises a top portion or canopy 11, which is connected via cords or shroud lines 12 with a load-carrier 13. In the illustrated embodiment, the load-carrier 13 is the load itself.

The canopy 11 of the parachute is manufactured in the customary manner from a number of widths of material, and has several openings (not illustrated) through which air can flow.

A total of eight equidistantly spaced shroud lines 12 are fastened to the lower edge 14 of the canopy 11. Such fastening is effected in a customary manner, for example by sewing, clamping, riveting, knotting, etc.

The shroud lines 12 extend from the lower edge 14 of the canopy 11 to the upper edge of the load 13, to which they are also fixedly attached. The connection of the lines 12 to the load 13 is effected in a manner similar to the connection to the canopy 11.

The shroud lines 12 extend between the canopy 11 and the load 13 in such a way that each line 12 is offset relative to the imaginary central longitudinal axis 15 of the parachute 10. In other words, the individual lines 12 are disposed in such a way that they have no overall common point of intersection of their imaginary extensions in the direction toward the load 13.

Instead, each individual shroud line 12 is disposed in such a way that if a longitudinal section is placed through the parachute, with not only the corresponding shroud line connection point 16 on the canopy 11, but also the central longitudinal axis 15 of the parachute 10, being disposed in the sectional plane, this line extends at a definite angle to the imaginary sectional plane.

In the embodiment illustrated in FIG. 1, the direction of rotation of the parachute canopy 11 is indicated by the arrow R.

Of the eight shroud lines 12, four of the lines 12a to 12d are arranged in such a way that when viewed in the direction of rotation R, they extend at an angle between the canopy 11 and the load 13, while the remaining four shroud lines 12e to 12h are disposed between the canopy 11 and the load 13 at the opposite angle of inclination.

Due to this oppositely-directed orientation of the shroud lines 12a to 12d and 12e to 12h, each line 12 crosses at least two other lines. For example, the shroud line 12b passes the lines 12e and 12h at the intersections 19, 20.

Figure 2:
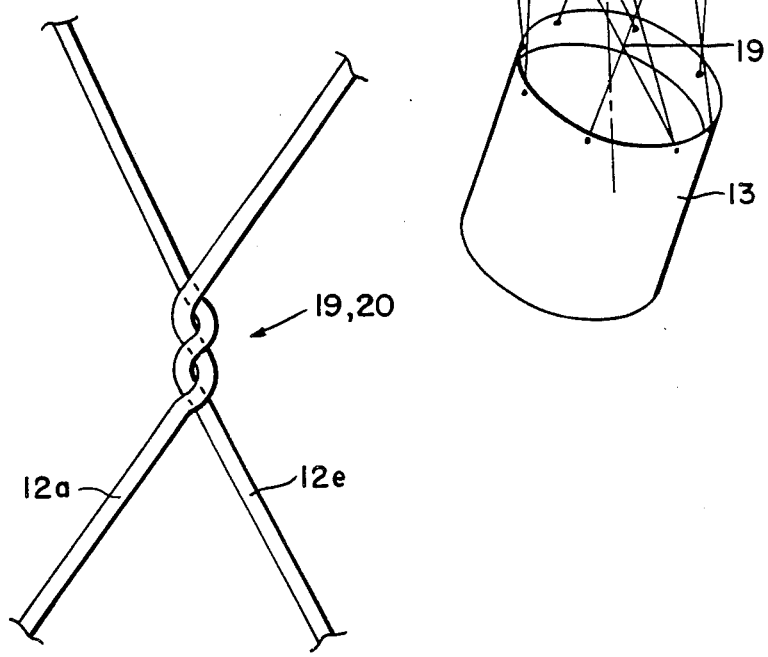
FIG. 2 is a fragmentary view showing a slip-free connection of two shroud line segments.

At the intersections 19, 20, the shroud lines which cross one another at that location are connected to one another in a shift-resistant or slip-resistant manner. One example of such a connection is illustrated in FIG. 2. In this example, the shroud lines 12, which are twisted cords, are triply spliced or joined to one another, as a result of which an extremely reliable connection of the shroud lines 12 to one another is achieved.

Thus, for example by the intersection 19, a "fixed" triangle is formed having corners formed by the intersection 19 and the shroud line connection points of the lines 12b and 12e on the load 13.

The intersections 19, 20, which, as can be seen from FIG. 1, are also present between all of the remaining shroud lines 12, are of particular significance in that they can prevent displacements or shifts of the individual lines of the canopy 11. Otherwise, i.e. if the shroud lines are not fixedly interconnected by appropriate intersections, the flexibility of the canopy 11 would lead to relative displacements which would adversely affect the descent properties of such a parachute.

In place of the joint illustrated in FIG. 2, standard knots or sewing can also, for example, be provided between the shroud lines 12, as long as these measures assure that the connection is shift resistant.

In the embodiment illustrated in FIG. 1, the load 13 is suspended at an angle; i.e., the upper surface of the load 13 is not parallel to the surface formed by the lower edge 14 of the canopy 11. Expressed in other words, the upper surface of the load 13 is not horizontally disposed during a vertical descent of the parachute 10. This is achieved by providing the individual shroud lines 12 with different lengths. As is readily apparent from FIG. 1, the shroud line 12e, for example, is clearly longer than the line 12h.

If the parachute canopy 11 is now caused to rotate, the shroud lines 12a to 12d which are at an angle to the direction of rotation are immediately drawn taut, so that the load 13 is immediately caused to follow. As a result, the load 13, proceeding from the canopy 11, is caused to rotate without delay in the same direction of rotation. However, despite the rotation of the load 13, it is possible due to the inventive arrangement of the shroud lines 12 to prevent the lines from twisting.

A parachute which is equipped with the inventive features has an exceptionally good descent characteristic, a particularly favorable inherent stability, and a minimum angle of swing.

The descent characteristic can be improved even further if a tension line (not illustrated) is integrated in the region of the lower edge (base) 14 of the parachute canopy 11. This tension line extends from one shroud line connection point to another, and is connected to these points. The length between each two adjacent shroud line connection points must be less than that length of the lower edge 14 of the canopy 11 formed between these two adjacent shroud line connection points. This assures that even when the canopy is filled with air, the shroud line connection points will be equidistantly spaced, so that the descent characteristic of the parachute is not adversely affected. Thus, when the canopy is filled with air and is viewed in plan, the tension line has the shape of a polygon, with the number of corners corresponding to the number of shroud lines. The tension line provided is disposed on the lower peripheral edge 14 on the inside of the canopy in a manner similar to a pull cord. When the canopy is filled, the line is linearly taut.

Figure 3:
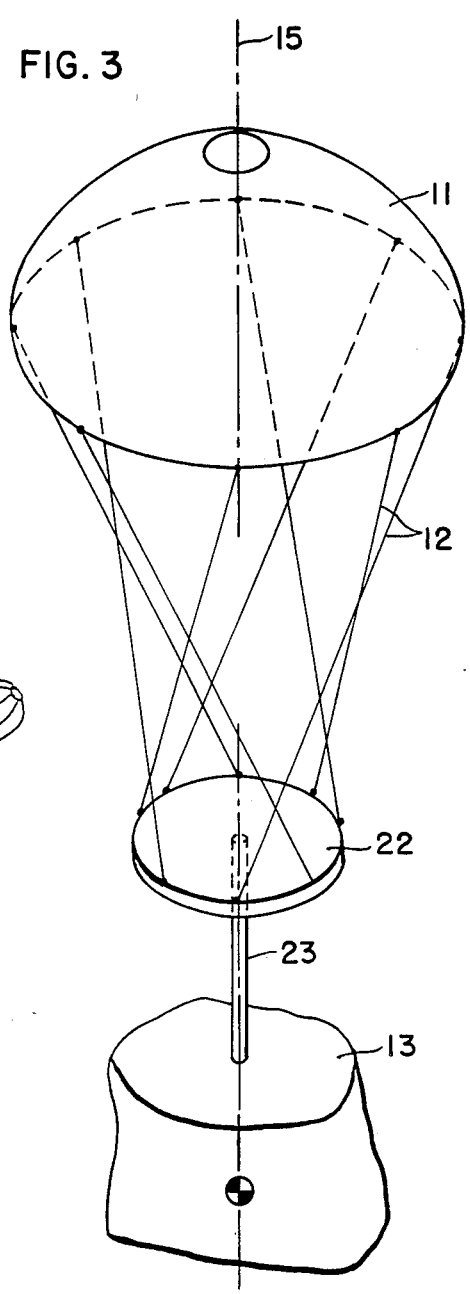
FIG. 3 is a schematic perspective view of one inventive embodiment of a rescue system.

FIG. 3 illustrates one exemplary embodiment of an inventive rescue system, with an intermediate member 22 being disposed between the rotating parachute 10 and the load 13.

The disposition of the shroud lines 12 between the canopy 11 and the intermediate member 22 corresponds nearly completely to the disposition illustrated in FIG. 1. However, in the embodiment of FIG. 3, the lengths of the individual shroud lines 12 are the same, so that during a vertical descent the intermediate member 22 is horizontally disposed. Of course, such an arrangement of the shroud lines 12 is also possible in the embodiment of FIG. 1.

A flexible shaft 23 extends downwardly perpendicular to the intermediate member 22; the other end of the shaft 23 is connected to the load 13. This shaft 23 is detachably disposed between the intermediate member 22 and the load 13, so that after the parachute has descended, the shaft can be readily and easily removed.

It should be noted that the load 13 can be eccentrically suspended on the shaft 23.

The shaft 23, or some other connection disposed at this location between the canopy 11 and the load 13, must be provided in such a way that on the one hand it is fixed against rotation relative thereto, yet on the other hand provides a flexible connection to the load 13. In particular, the shaft must not be able to twist on its own.

Figure 4A:
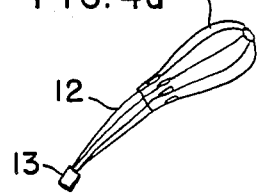
FIGS. 4a–4c schematically illustrate in stages the unfolding and descent properties of an inventive rotating parachute or rescue system.
Figure 4B:
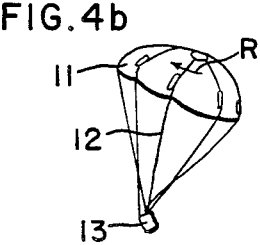
Figure 4C:
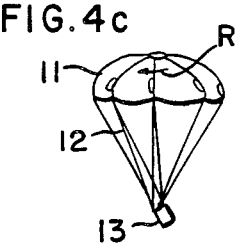

FIGS. 4a to 4c illustrate how the inventive parachute unfolds and subsequently descends. In this embodiment also the load 13 is suspended at an angle.

After release of the parachute (FIG. 4a), the parachute unfolds to such an extent that it is completely filled (FIG. 4b). In so doing, for example, the rotation of the parachute canopy is, for example, two revolutions per second. Shortly thereafter the stationary state is achieved, whereby the canopy 11 and the load 13 rotate synchronously two times per second.

The inventive rotating parachute, or a complete rescue system, can be used for varied applications. For example, it can be used for orientation or navigation purposes, or for cameras for taking panoramic photographs.

The greater the distance of the shroud line connection points on the load 13 from the imaginary central longitudinal axis of the parachute, the greater the torque which can be transmitted.

The present invention is, of course, in no way restricted to the specific disclosure of the specification and drawings, but also encompasses any modifications within the scope of the appended claims.

What I claim is:

1. A rotating parachute, which includes a canopy, a load-carrier for a load being suspended to be transported therewith, and shroud lines for connecting said load-carrier to said canopy comprising;

the improvement therewith including means for causing rotation of the parachute and transmitting rotation to cause the load to rotate also wherein said shroud lines are arranged to come in helically between the canopy and the load carrier as offset relative to the central longitudinal axis of said parachute, said shroud lines being arranged collectively subject to interconnection although via helical arrangement of lines bringing together all shroud lines for auto-rotation with the canopy, and furthermore the load being connected helically offset with said shroud lines such that rotation of the parachute is converted also into a rotation of the load.

2. A parachute according to claim 1, in which said shroud lines are offset in such a way, that a given shroud line has at least one intersection with at least one other shroud line.

3. A parachute according to claim 2, in which each shroud line has two intersections, one with each of two other shroud lines.

4. A parachute according to claim 3, in which said shroud lines are connected to said canopy at connection points; and in which, from at least one of said connection points, at least two shroud lines extend, which remote from said connection points are connected to said load-carrier.

5. A parachute according to claim 3, in which said shroud lines are of different lengths.

6. A parachute according to claim 5, in which said shroud lines comprise twisted cords.

7. A parachute according to claim 3, in which said shroud lines are connected to one another in a slip-free manner at said intersections.

8. A parachute according to claim 7, in which said shroud lines are spliced together to form said slip-free intersections.

9. A parachute according to claim 1, in which said shroud lines are disposed to obtain a skewed orientation of individual shroud lines inclined between the canopy and the load carrier extending in different directions relative to the direction of rotation of said canopy to achieve a parachute system stabilization as a whole although being able to impart a rotation also to the load including arrangement of a camera intended for taking panoramic photographs with which rotation of the load camera is separately imparted as well as being transmitted via rotation of the parachute canopy whereby there is made possible to achieve a rotation of the parachute canopy but also to transmit directly or indirectly any energy of rotation to a suspended load since the skewed orientation of the shroud lines already exists in an unfolded state of the parachute when the canopy itself does not yet rotate although, when the canopy does start to rotate, the individual shroud lines are already disposed so that the load camera and the load-carrier can follow immediately.

10. A parachute according to claim 3, in which said canopy has a peripheral edge; in which said shroud lines are connected to said canopy, in the vicinity of said edge, at connection points; and which includes tension means for interconnecting said shroud lines connection points; the length of said tension means between given ones of said connection points is less than the length of the corresponding portion of said canopy edge between said same connection points.

11. A parachute according to claim 10, in which said tension means is a cord.

12. A parachute according to claim 3, which is incorporated as part of a rescue system; and which includes a member disposed between said canopy and said load-carrier; said shroud lines extend between said canopy and said member, and said load-carrier is suspended from said member.

13. A parachute according to claim 12, in which said member is a round plate.

14. A parachute according to claim 12, in which said suspension of said load-carrier on said member is effected by means of a non-rotatable yet flexible connecting element.

15. A parachute according to claim 14, in which said connecting element is a flexible shaft.

16. A parachute according to claim 14, in which said connecting element is a non-rotatable steel cable.

* * * * *